(12) United States Patent
Tran (10) Patent No.: US 12,527,342 B2
(45) Date of Patent: Jan. 20, 2026

(54) SUPPLEMENTARY COMPOSITION CONTAINING 2'-FUCOSYLLACTOSE (2'-FL) AND FRUCTO-OLIGOSACCHARIDE (FOS) WITH SYNERGISTIC EFFECTS ON THE DIGESTIVE AND IMMUNE SYSTEMS FOR CHILDREN, AND PROCESS OF MANUFACTURING A CHILDREN FORMULA CONTAINING SAID SUPPLEMENTARY COMPOSITION

(71) Applicant: Thi Le Tran, Ho Chi Minh (VN)

(72) Inventor: Thi Le Tran, Ho Chi Minh (VN)

(73) Assignee: NUTIFOOD NUTRITION FOOD JOINT STOCK COMPANY, Ho Chi Minh (VN)

( * ) Notice: Subject to any disclaimer, the term of this patent is extended or adjusted under 35 U.S.C. 154(b) by 0 days.

(21) Appl. No.: 19/014,237

(22) Filed: Jan. 9, 2025

(65) Prior Publication Data
US 2025/0228282 A1    Jul. 17, 2025

(30) Foreign Application Priority Data
Jan. 12, 2024   (VN) ............................... 1-2024-00241

(51) Int. Cl.
*A23L 33/00*   (2016.01)
*A23L 33/10*   (2016.01)

(52) U.S. Cl.
CPC .............. *A23L 33/40* (2016.08); *A23L 33/10* (2016.08)

(58) Field of Classification Search
CPC .. A61K 31/702; A61K 35/741; A61K 31/715; A61K 2035/115; A23V 2250/28; A23V 2250/284; A23V 2200/3202; A23V 2200/30; A23L 33/40; A23L 33/21; A23L 33/135; A23L 33/10; A23L 33/19
USPC ............................... 426/801, 658, 72, 71, 74
See application file for complete search history.

(56) References Cited

U.S. PATENT DOCUMENTS 9,161,563 B2 *  10/2015  Sprenger ................ C07H 13/04
10,588,965 B2 *  3/2020  Stahl ........................ A23L 33/10

FOREIGN PATENT DOCUMENTS

WO    WO-2011012655 A1 *  2/2011  .............. A61P 37/08

\* cited by examiner

*Primary Examiner* — Hong T Yoo (57) ABSTRACT

A process of manufacturing a children formula in a powder or solution form comprising the steps of mixing homogeneously nutritional components and a supplementary composition containing 2'-fucosyllactose (2'-FL) and fructo-oligosaccharide (FOS), such that when the children formula is fed to the child a chance of the child developing digestive disorders and respiratory infection is reduced, wherein a ratio between 2'-fucosyllactose (2'-FL) and fructo-oligosaccharide (FOS) is 1:(16-100) (w/w); in which the fructo-oligosaccharide (FOS) includes Oligofructose and Inulin, and a ratio between Oligofructose and Inulin is 1:1 (w/w).

7 Claims, 1 Drawing Sheet

SUPPLEMENTARY COMPOSITION CONTAINING 2'-FUCOSYLLACTOSE (2'-FL) AND FRUCTO-OLIGOSACCHARIDE (FOS) WITH SYNERGISTIC EFFECTS ON THE DIGESTIVE AND IMMUNE SYSTEMS FOR CHILDREN, AND PROCESS OF MANUFACTURING A CHILDREN FORMULA CONTAINING SAID SUPPLEMENTARY COMPOSITION

CLAIM OF PRIORITY

This application claims priority under 35 U.S.C. § 112(d) of application No. 1-2024-00241, filed on 12 Jan. 2024, in the Republic Socialist of Vietnam. The patent application identified above is incorporated here by reference in its entirety.

FIELD OF THE INVENTION

The invention pertains to the field of infant nutrition. Specifically, it relates to a supplementary composition containing 2'-fucosyllactose (2'-fl) and fructo-oligosaccharide (fos) with synergistic effects on the digestive and immune systems for children, and process of manufacturing a children formula containing said supplementary composition.

BACKGROUND ART

Malnutrition is a pathological condition associated with one-third of deaths among children under the age of five, predominantly in Asia and Africa. The consequences of malnutrition include susceptibility to infections such as gastrointestinal infections and respiratory infections, as well as impaired physical and intellectual development [1]. According to the 2013 statistics from the World Health Organization, diarrhea caused by bacterial infections contributes to 15% of child mortality [2]. Therefore, preventing infections by enhancing the immune capacity of children will help reduce the risk of illnesses and address the root cause of malnutrition in children.

One of the solutions to support the digestive system and boost immunity to prevent respiratory diseases is the use of nutritional products enriched with beneficial oligosaccharides for children, such as HMOs and prebiotics (FOS, Inulin). HMOs are oligosaccharides found in breast milk, with 2'-fucosyllactose (2'-FL) being particularly notable. In addition to its benefits for the digestive system, clinical studies have demonstrated its immune-boosting properties, reduction in respiratory infections, enhancement of cognitive abilities, and alleviation of formula intolerance symptoms in children [3]. In addition to its positive effects on the digestive system, such as stimulating digestion, modulating gut microbiota composition, and increasing short-chain fatty acid levels, prebiotics also play a role in stimulating gastrointestinal immunity. Prebiotics enhance the activity of beneficial gut bacteria, particularly Bifidobacteria, increase macrophage activity, and promote the secretion of local IgA antibodies, as well as regulate other nonspecific immune responses in the body [4, 5].

Currently, there are existing patents worldwide related to the combination of HMOs and prebiotic oligosaccharides in infant formula nutritional products, such as:

Patent application No. WO2013025104A1 discloses a nutritional mixture comprising at least one α1,2-fucosylated HMO and at least one HMO stabilizer, such as prebiotic oligosaccharides (including FOS, GOS, or a combination of both), maltodextrin, and lactoferrin. However, this patent application does not address the synergistic effects of combining HMOs and prebiotic FOS on supporting healthy immunity and digestion.

Patent application No. WO2022189417A1 discloses a liquid oligosaccharide preparation with a solids content of 50-80% by weight, where 45-100% of the solids consist of: (i) one or more oligosaccharides selected from galacto-oligosaccharides (GOS), fructo-oligosaccharides (FOS), polydextrose (PDX), or their combinations, and (ii) one or more human milk oligosaccharides (HMOs). The weight ratio of (i) to (ii) ranges from 0.25 to 600. Although it shares the component 2'-FL, the ratio between 2'-FL and FOS is entirely different, and the patent prioritizes GOS in combination with 2'-FL based on clinical experiments.

According to patent No. U.S. Pat. No. 11,260,067B2, a nutritional composition containing at least two human milk oligosaccharides in a total amount of 0.1 to 10% by weight of the nutritional composition and hydrolyzed protein, at least two human milk oligosaccharides comprising at least 2'-FL and lacto-N-neotetraose (LNnT). In addition, the invention also discloses a nutritional composition containing HMO combined with FOS or a mixture of FOS (Oligofructose and Inulin). Although there is overlap in the composition of 2'-FL and FOS or a mixture of FOS (Oligofructose and Inulin), the nature of the nutritional composition of this invention requires a combination of at least two human milk oligosaccharides including at least 2'-FL and LNnT when combined with FOS or a mixture of FOS (Oligofructose and Inulin) to effectively reduce the concentration of harmful proteolytic metabolites (e.g. short-chain branched fatty acids) in the gastrointestinal tract of infants or young children.

The above technical solutions meet certain objectives and technical requirements. However, none of them disclose the following three technical aspects: (a1) the amounts of the supplementary composition containing 2'-fucosyllactose (2'-FL) and fructo-oligosaccharide (FOS) presented in the children formula in a powder or solution form, wherein said 2'-fucosyllactose (2'-FL) is in a concentration of 0.032 grams per 100 grams powder or 0.032 grams per 100 milliliters solution and said fructo-oligosaccharide (FOS) is in a concentration of 0.54 grams per 100 grams powder or 0.54 grams per 100 milliliters solution; (a2) the amounts of nutritional components combined with the supplementary composition to form the children formula, which differ from the disclosed patents; and (a3) the specific amounts of the supplementary composition containing 2'-fucosyllactose (2'-FL) and fructo-oligosaccharide (FOS) presented in the children formula have been tested on populations, proving their synergistic effects on both the digestive and immune systems of young children. Specifically, the children formula not only causes no allergic reactions but also improves nutritional status, dietary intake, digestive disorders, and respiratory infections in children aged 3-5 years, particularly in malnourished or at-risk children.

This invention provides solutions to achieve the above goals.

SUMMARY OF THE INVENTION

Accordingly, an objective of the present invention is to provide a children formula in a powder or solution form comprising nutritional components and a supplementary composition containing 2'-fucosyllactose (2'-FL) and fructo-oligosaccharide (FOS), such that when the children formula is fed to the child a chance of the children developing digestive disorders and respiratory infection are reduced, wherein a ratio between 2'-fucosyllactose (2'-FL) and fructo-oligosaccharide (FOS) is 1:(16-100) (w/w); in which the fructo-oligosaccharide (FOS) includes Oligofructose and Inulin, and a ratio between Oligofructose and Inulin is 1:1 (w/w).

Another objective of the present invention is to provide a process of manufacturing a children formula in a powder or solution form comprising the steps of mixing homogeneously nutritional components and a supplementary composition containing 2'-fucosyllactose (2'-FL) and fructo-oligosaccharide (FOS), such that when the children formula is fed to the child a chance of the child developing digestive disorders and respiratory infection is reduced, wherein a ratio between 2'-fucosyllactose (2'-FL) and fructo-oligosaccharide (FOS) is 1:(16-100) (w/w); in which the fructo-oligosaccharide (FOS) includes Oligofructose and Inulin, and a ratio between Oligofructose and Inulin is 1:1 (w/w).

Finally, the purpose of the invention is to provide method of feeding a child comprising the steps of dissolving a children formula powder containing nutritional components and a supplementary composition containing 2'-fucosyllactose (2'-FL) and fructo-oligosaccharide (FOS) in water for obtaining a solution including said nutritional components and said supplementary composition and feeding the child with said solution, thereby reducing a chance of the children of developing digestive disorders and respiratory infection, wherein a ratio between 2'-fucosyllactose (2'-FL) and fructo-oligosaccharide (FOS) is 1:(16-100) (w/w); in which the fructo-oligosaccharide (FOS) includes Oligofructose and Inulin, and a ratio between Oligofructose and Inulin is 1:1 (w/w).

These and other advantages of the present invention will no doubt become obvious to those of ordinary skill in the art after having read the following detailed description of the preferred embodiments, which are illustrated in the various drawing Figures.

BRIEF DESCRIPTION OF THE DRAWING

The accompanying drawings, which are incorporated in and form a part of this specification, illustrate embodiments of the invention and together with the description, serve to explain the principles of the invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, and components, have not been described in detail so as not to unnecessarily obscure aspects of the present invention.

As used herein, the following terms have the following meanings. The term "infant" means a child under the age of 12 months.

The expression "young children" means such as a child aged between one and three years (also called toddler) or a child aged between three and five years (also called preschooler) or a child aged between five and thirteen years (also called child).

As used herein, the following terms have the following meanings. The expression "children formula" means a composition which nourishes a subject. This children formula is usually to be taken orally, and it usually includes a lipid or fat source and a protein source. In a particular embodiment the children formula of the present invention is a hypoallergenic children formula. The expression "hypoallergenic children formula" means a children formula which is unlikely to cause allergic reactions. In a particular embodiment the children formula of the present invention is a "synthetic nutritional composition". The expression "synthetic nutritional composition" means a mixture obtained by chemical and/or biological means, which can be chemically identical to the mixture naturally occurring in mammalian milks (i.e. the synthetic composition is not breast milk), or derived from nut milk, or are derived from soy, or are derived from granulated vegetable milk. The children formula of the present invention can be in solid form (e.g. powder) or in liquid form. The amount of the various components (e.g. the oligosaccharides) can be expressed in g/100 g of the children formula on a dry weight basis when it is in a solid form, e.g. a powder, or as a concentration in g/L of the children formula when it refers to a liquid form (this latter also encompasses liquid composition that may be obtained from a powder after reconstitution in a liquid such as milk, water . . . , e.g. a reconstituted infant formula or a follow-on/follow-up formula or an infant cereal product or any other formulation designed for infant nutrition or a young formula). They can also be expressed in g/100 kcal.

By the expressions "preventing" or "prevention", it is meant avoiding that a physical state, a condition or their consequences occurs and/or decreasing its incidence (i.e. reduction of the frequency).

By the expressions "treating" or "treatment", it is meant a decrease of the duration and/or of the severity of a physical state, a condition or their consequences. The prevention and/or the treatment of a physical state, a condition or their consequences can occur during the treatment (i.e. during the administration of the composition of the present invention, either immediately after the start of the administration or some time after, e.g. some days or weeks after the start).

In addition, in the context of the invention, the terms "comprising" or "comprises" do not exclude other possible elements. The composition of the present invention, including the many embodiments described herein, can comprise, consist of, or consist essentially of the essential elements and limitations of the invention described herein, as well as any additional or optional ingredients, components, or limitations described herein or otherwise depending on the needs.

In accordance with aspect of the present invention there is provided a children formula 100 ("formula 100") in a powder or solution form comprising nutritional components and a supplementary composition containing 2'-fucosyllactose (2'-FL) and fructo-oligosaccharide (FOS), such that when the children formula is fed to the child a chance of the child developing digestive disorders and respiratory infection is reduced.

In a particularly advantageous embodiment of the present invention, the fructo-oligosaccharide (FOS) according to the invention comprises Oligofructose and Inulin.

In a preferred embodiment, the Oligofructose and Inulin can be present in the fructo-oligosaccharide (FOS) according to the present invention in a ratio of 1:1 (w/w).

In a preferred embodiment, the 2'-fucosyllactose (2'-FL) and fructo-oligosaccharide (FOS) can be present in the supplementary composition according to the present invention in a ratio of 1:(16-100) (w/w), preferably 1:(16-18) (w/w) or 1:16.875 (w/w).

In a particularly advantageous embodiment of the present invention, the 2'-fucosyllactose (2'-FL) can be present in the formula 100 according to the present invention in a concentration of 0.032 grams per 100 grams powder or 0.032 grams per 100 milliliters solution.

In another specific embodiment, the fructo-oligosaccharide (FOS) can be present in the formula 100 according to the present invention in a concentration of 0.54 grams per 100 grams powder or 0.54 grams per 100 milliliters solution.

According to the embodiment of the present invention, the formula 100 is an infant formula or a young children formula.

According to the preferred embodiment of the present invention, the formula 100 is a young children formula.

According to the embodiment of the present invention, the nutritional components may include milk or soy derived nutritional components, preferably cow's milk. It will be further understood that the expression "nutritional components" not comprising said supplementary composition that does not comprise the "containing 2'-fucosyllactose (2'-FL) and fructo-oligosaccharide (FOS) in a ratio of 1:(16-100) (w/w), preferably 1:(16-18) (w/w) or 1:16.875 (w/w)".

The nutritional components according to the invention generally include a protein source, a carbohydrate source, and a source of lipids, in which the carbohydrate source excludes 2'-fucosyllactose (2'-FL) and fructo-oligosaccharide (FOS). This is particularly relevant if the formula 100 of the invention is an infant formula or a young children formula. Any carbohydrate source conventionally found in infant formula or young children formula such as lactose, sucrose, saccharose, maltodextrin, starch and mixtures thereof may be used. In this case, the lipid source may be any lipid or fat which is suitable for use in infant formulae or young children formula. Some suitable fat sources include palm oil, olive oil, high oleic sunflower oil and high oleic safflower oil. The essential fatty acids linoleic and α-linolenic acid may also be added, as well small amounts of oils containing high quantities of preformed arachidonic acid and docosahexaenoic acid such as fish oils or microbial oils.

In one embodiment, the nutritional components of this invention comprises medium-chain triglycerides (MCT fat).

The nutritional components according to the invention generally further comprising choline, taurine, and tysine.

According to the embodiment of the present invention, the nutritional components further comprising all vitamins and minerals understood to be essential in the daily diet and in nutritionally significant amounts. Minimum requirements have been established for certain vitamins and minerals. Minerals are usually added in salt form. The presence and amounts of specific minerals and other vitamins will vary depending on the intended population. Examples of vitamins and minerals optionally present in the composition of the invention include vitamine A, vitamine D3, vitamine K1, vitamine B1, vitamine B3, vitamine B5, vitamine B6, vitamine B9, biotin, sodium (Na), potassium (K), calcium (Ca), phosphorus (P), magnesium (Mg), iodine (I), zinc (Zn), and selenium (Se).

In another embodiment of the invention, if necessary, the nutritional components may contain emulsifiers and stabilizers such as soy lecithin, citric acid esters of mono- and diglycerides, and the like. It may also contain other substances that may have beneficial effects such as lactoferrin, nucleotides, nucleosides, probiotics, food additives and the like.

Figure 1:
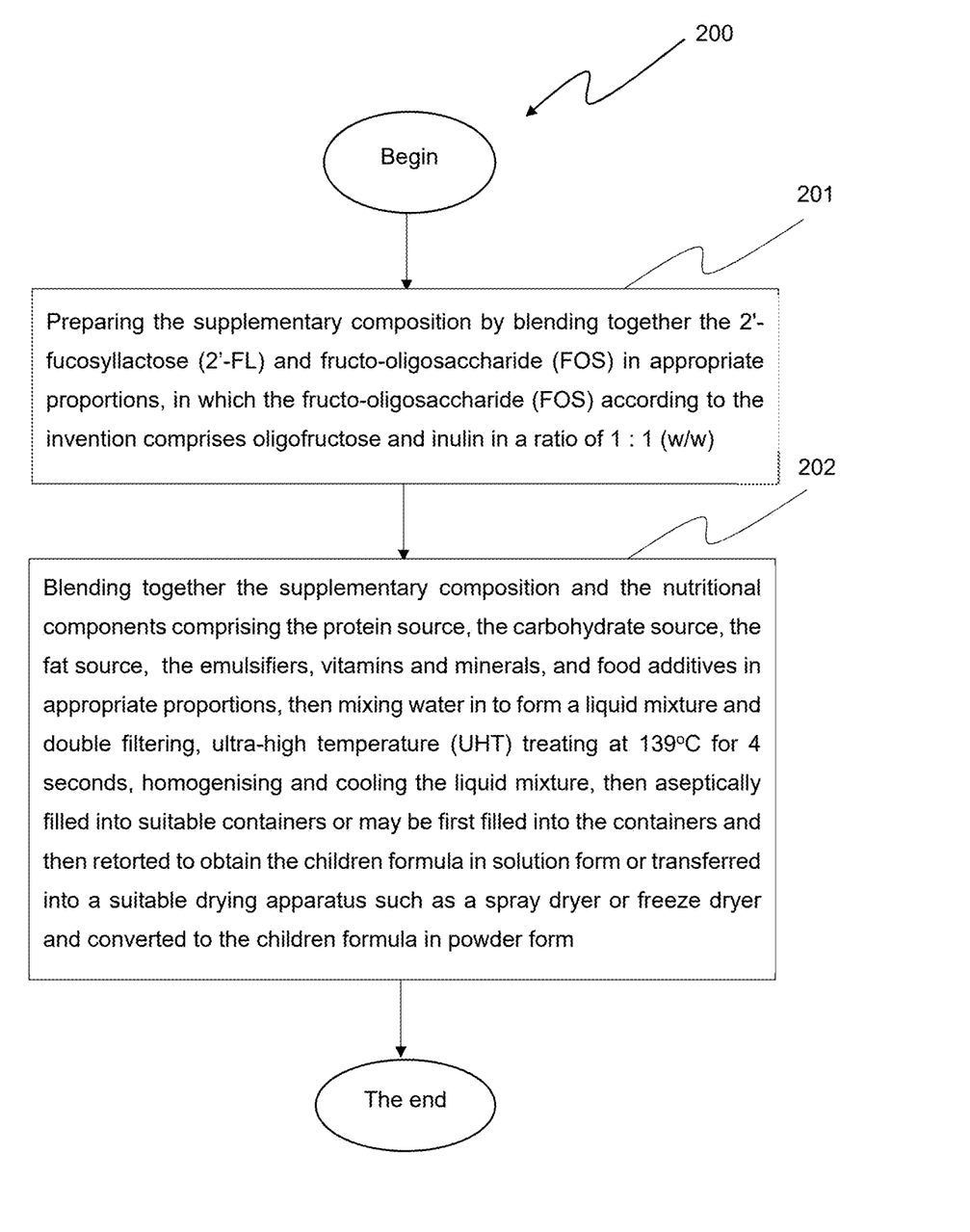
FIG. 1 is a flowchart illustrating a method of manufacturing a children formula containing the supplementary composition according to an embodiment of the present invention.

The formula 100 according to the invention may be prepared in any suitable manner. The formula 100 will now be described by way of example. Referring to FIG. 1, the manufacturing process of the formula 100 such as a young children formula 200 ("process 200") in accordance with an exemplary embodiment of the present invention, including the steps:

At step 201, preparing the supplementary composition by blending together the 2'-fucosyllactose (2'-FL) and fructo-oligosaccharide (FOS) in appropriate proportions, in which the fructo-oligosaccharide (FOS) according to the invention comprises oligofructose and inulin in a ratio of 1:1 (w/w).

According to a preferred embodiment of the present invention, the 2'-fucosyllactose (2'-FL) and fructo-oligosaccharide (FOS) can be present in the supplementary composition according to the present invention in a ratio of 1:(16-100) (w/w), preferably 1:(16-18) (w/w) or 1:16.875 (w/w).

Finally, at step 202, blending together the supplementary composition and the nutritional components comprising the protein source, the carbohydrate source, the fat source, the emulsifiers, vitamins and minerals, and food additives in appropriate proportions, then mixing water in to form a liquid mixture, in which any lipophilic vitamins, emulsifiers and the like may be dissolved into the fat source prior to blending.

According to the invention, the liquid mixture may then be again homogenise, in which the pH and solids content of the homogenised mixture are conveniently adjusted at this point.

Step 202 according to the process 200 further comprising double filtering, ultra-high temperature (UHT) treating at 139° C. for 4 seconds, homogenising and cooling the liquid mixture, then aseptically filled into suitable containers or may be first filled into the containers and then retorted to obtain the formula 100 in solution form, in which the formula 100 in solution form contains 2'-fucosyllactose (2'-FL) is in a concentration of 0.032 grams per 100 milliliters solution and fructo-oligosaccharide (FOS) is in a concentration of 0.54 grams per 100 milliliters solution.

According to other embodiments of the invention, step 202 according to the process 200 further comprising double filtering, ultra-high temperature (UHT) treating at 139° C. for 4 seconds, homogenising and cooling the liquid mixture, then transferred into a suitable drying apparatus such as a spray dryer or freeze dryer and converted to the formula 100 in powder form, in which the formula 100 in powder form contains 2'-fucosyllactose (2'-FL) is in a concentration of 0.032 grams per 100 grams powder and fructo-oligosaccharide (FOS) is in a concentration of 0.54 grams per 100 grams powder. The formula 100 in powder form should have a moisture content of less than about 5% by weight.

In one embodiment, the formula 100 will also be described by way of other example. Referring to the manufacturing process of the formula 100 in powder form such as a young children formula 300 ("process 300") in accordance with an exemplary embodiment of the present invention, including the steps:

At step (A), preparing the supplementary composition is performed similarly to step 201 according to process 200 described in detail above.

Finally, at step (B), preparing the nutritional components derived from milk by blending together the protein source, the carbohydrate source, the fat source, the emulsifiers, vitamins and minerals, and food additives in appropriate proportions, then mixing water in to form a liquid mixture, in which any lipophilic vitamins, emulsifiers and the like may be dissolved into the fat source prior to blending.

According to other embodiments of the invention, step (B) according to the process 300 further comprising double filtering, ultra-high temperature (UHT) treating at 139° C. for 4 seconds, homogenising and cooling the liquid mixture, then transferred into a suitable drying apparatus such as a spray dryer or freeze dryer and converted to powder, then adding the supplementary composition for 4-8 minutes by dry-mixing, and aseptically filled into suitable containers to obtain the formula 100 in powder form, in which the formula 100 in powder form contains 2'-fucosyllactose (2'-FL) is in a concentration of 0.032 grams per 100 grams powder and fructo-oligosaccharide (FOS) is in a concentration of 0.54 grams per 100 grams powder. It should be noted that step (B) is performed by a suitable drying apparatus such as a spray dryer or freeze dryer, in which said spray dryer or freeze dryer apparatus has been known in previous art so the description of the structure and its operating principle will not be described in detail in the invention.

In one another embodiment, the formula 100 will also be described by way of example. Referring to the manufacturing process of the formula 100 in powder form such as a young children formula 400 ("process 400") in accordance with an exemplary embodiment of the present invention, including the steps:

At step (A'), preparing the supplementary composition is performed similarly to step 201 according to process 200 described in detail above.

Finally, at step (B'), preparing the nutritional components derived from milk by blending together the protein source, the carbohydrate source, the fat source, the emulsifiers, vitamins and minerals, and food additives in appropriate proportions, then mixing water in to form a liquid mixture, in which any lipophilic vitamins, emulsifiers and the like may be dissolved into the fat source prior to blending.

According to other embodiments of the invention, step (B) according to the process 400 further comprising double filtering, ultra-high temperature (UHT) treating at 139° C. for 4 seconds, homogenising and cooling the liquid mixture, adding the supplementary composition for 4-8 minutes by dry-mixing or by blending them in a syrup form of crystals, then transferred into a suitable drying apparatus such as a spray dryer or freeze dryer and converted to the formula 100 in powder form, in which the formula 100 in powder form contains 2'-fucosyllactose (2'-FL) is in a concentration of 0.032 grams per 100 grams powder and fructo-oligosaccharide (FOS) is in a concentration of 0.54 grams per 100 grams powder. The formula 100 in powder form should have a moisture content of less than about 5% by weight.

In accordance with another aspect of the present invention there is provided a method of feeding a child. The method is effected by executing the following steps. First a formula 100 powder containing nutritional components and a supplementary composition is solubilized in water for obtaining a solution including the nutritional components and the supplementary composition. Second, the solution is fed to the child.

According to a preferred embodiment of the present invention, the fructo-oligosaccharide (FOS) comprises Oligofructose and Inulin. The Oligofructose and Inulin can be present in the fructo-oligosaccharide (FOS) according to the present invention in a ratio of 1:1 (w/w).

According to a preferred embodiment of the present invention, the supplementary composition contains 2'-fucosyllactose (2'-FL) and fructo-oligosaccharide (FOS). The 2'-fucosyllactose (2'-FL) and fructo-oligosaccharide (FOS) can be present in the supplementary composition according to the present invention in a ratio of 1:(16-100) (w/w), preferably 1:(16-18) (w/w) or 1:16.875 (w/w).

In a particularly advantageous embodiment of the present invention, the 2'-fucosyllactose (2'-FL) can be present in the formula 100 according to the present invention in a concentration of 0.032 grams per 100 grams powder or 0.032 grams per 100 milliliters solution.

In another specific embodiment, the fructo-oligosaccharide (FOS) can be present in the formula 100 according to the present invention in a concentration of 0.54 grams per 100 grams powder or 0.54 grams per 100 milliliters solution.

Community trials were conducted to evaluate the effectiveness of the formula 100 in solution form such as a young children formula, based on a specific embodiment of the invention, in assessing its impact on the nutritional status, digestion, and respiratory infections in children aged 3-5 years. These trials were led by Dr. Nguyen Lan at the National Institute of Nutrition, under the Vietnam Ministry of Health.

(A') Materials and Methods:

Study population (n=1.345): the study included children aged 3-5 years enrolled in four public preschools located in three communes Vo Tranh, Binh Son, and Luc Son in Luc Nam District, Bac Giang Province. Eligible children had no congenital abnormalities, and their parents consented to their participation in the study.

Characteristics of children eligible for study entry with weight-for-age (WHZ) indicators through weight-for-age index (Z-score) with values of $-3SD<Z\text{-score}<0SD$; in which SD is the standard deviation of the reference population.

Eligible children were divided into three groups as follows:

control group comprising 230 children who did not use the formula 100 over the four-month study period;

intervention group 1 comprising 232 children who consumed the formula 100 without fucosyllactose (2'-FL) and fructo-oligosaccharide (FOS), administered orally in 200 mL portions twice daily; and intervention group 2 comprising 228 children who consumed the formula 100, administered orally in 200 mL portions twice daily;

wherein the nutritional composition of 100 ml of the formula 100 without 2'-fucosyllactose (2'-FL) and fructo-oligosaccharide (FOS), and 100 ml of the formula 100 are detailed in Table 1 below.

Data collection: data on dietary intake, clinical observations, and anthropometric measurements of the children were collected and monitored at the start of the study, after two months, and after four months.

TABLE 1

Nutritional composition of 100 mL of the formula 100 without 2'-fucosyllactose (2'-FL) and fructo-oligosaccharide (FOS), and 100 mL of the formula 100 according to the invention

| Nutrient composition | Unit | The formula 100 without 2'-FL and FOS | The formula 100 | 200 mL/time with a frequency of 2 times/day | Response level RNI % (*) |
|---|---|---|---|---|---|
| Energy | Kcal | 89.68 | 89.68 | 358.72 | 27.6 |
| Protein | g | 3.23 | 3.23 | 12.92 | 51.7 |
| Fat | g | 3.9 | 3.9 | 15.6 | 35.5 |
| MCT Fat | g | 0.3 | 0.3 | 1.2 | — |
| Other carbohydrates excluding 2'-FL and FOS | g | 10.26 | 10.26 | 41.04 | 21.0 |
| FOS | g | — | 0.54 | 2.16 | — |
| Choline | mg | 11.4 | 11.4 | 45.6 | 18.2 |
| Taurine | mg | 7.6 | 7.6 | 30.4 | — |
| Lysine | mg | 285 | 285 | 1140 | 161.7 |
| Vitamine A | IU | 371 | 371 | 1484 | 89.1 |
| Vitamine D3 | IU | 62.7 | 62.7 | 250.8 | 41.8 |
| Vitamine K1 | mcg | 5.32 | 5.32 | 21.28 | 30.4 |
| Vitamine B1 | mcg | 85.5 | 85.5 | 342 | 48.9 |
| Vitamine B3 | mcg | 1140 | 1140 | 4560 | 57.0 |
| Vitamine B5 | mcg | 456 | 456 | 1824 | 60.8 |
| Vitamine B6 | mcg | 85.5 | 85.5 | 342 | 68.4 |
| Vitamine B9 | mcg | 34.2 | 34.2 | 136.8 | 91.2 |
| Biotin | mcg | 2.09 | 2.09 | 8.36 | 69.7 |
| Sodium (Na) | mg | 38 | 38 | 152 | 13.8 |
| Potassium (K) | mg | 104.5 | 104.5 | 418 | 38.0 |
| Calcium (Ca) | mg | 114 | 114 | 456 | 76.0 |
| Phosphorus (P) | mg | 104.5 | 104.5 | 418 | 83.6 |
| Magnesium (Mg) | mg | 9.5 | 9.5 | 38 | 38.0 |
| Iodine (I) | mcg | 15.2 | 15.2 | 60.8 | 67.6 |
| Zinc (Zn) | mg | 1.25 | 1.25 | 5 | 104.2 |
| Selenium (Se) | mcg | 0.95 | 0.95 | 3.8 | 19.0 |
| 2'-FL | g | | 0.032 | 0.128 | | in which: (*) is the level meeting RNI according to the Recommended Nutritional Requirements for Vietnamese people - Medical Publishing House 2016.

(B') Research Results:
(B$_1$) General Characteristics of the Study Population:
  (a) The general characteristics of the three communes: Vo Tranh, Binh Son, and Luc Son participating in the study show similar rates of malnutrition, and the economic status of all three communes is considered to be at a moderate level (as referenced in Table 2 below).

TABLE 2

Characteristics of the three communes participating in the study

| Characteristic | Vo Tranh | Binh Son | Luc Son |
|---|---|---|---|
| Population | 5,812 | 6,791 | 7,484 |
| Number of children under 5 years old | 662 | 697 | 734 |
| Malnutrition rate (underweight children under 5 years) in 2019 (%) | 12.3 | 13.2 | 13.1 |
| Number of public preschools | 2 | 1 | 1 |
| Economic classification | Medium | Medium | Medium |

(b) The characteristics of occupation and education among mothers in the control group, intervention group 1, and intervention group 2 show that the average age of mothers with children participating in the study was 30-31 years, with no statistically significant differences between the two intervention groups and the control group (p>0.05). Overall, the proportion of mothers with lower educational levels (below middle school) was smaller than those with higher educational levels (above high school), and no statistically significant differences were observed between the two intervention groups and the control group (p>0.05). Regarding occupation, mothers working in agriculture accounted for the highest proportion, over 50%, followed by worker/government employees at approximately 40%, housewives at around 5%, and traders at about 5%. Again, no statistically significant differences were found between the two intervention groups and the control group (p>0.05). This data is referenced in Table 3 below.

TABLE 3

Characteristics of occupation and education of mothers in the three study groups

| Characteristic | | Control group (n = 230) | | Intervention group 1 (n = 232) | | Intervention group 2 (n = 228) | | p** |
| --- | --- | --- | --- | --- | --- | --- | --- | --- |
| | | n | (%) | n | (%) | n | (%) | |
| Age (years) | | 230 | 30.4 ± 5.3 | 232 | 31.0 ± 5.5 | 228 | 31.3 ± 6.7 | >0.05 |
| Occupation | Agriculture | 119 | 51.7 | 111 | 47.8 | 116 | 50.9 | >0.05 |
| | Worker/Government employee | 85 | 37 | 97 | 41.8 | 88 | 38.6 | |
| | Housewife | 16 | 7 | 13 | 5.6 | 10 | 4.4 | |
| | Trader | 10 | 4.3 | 10 | 4.3 | 14 | 6.1 | |
| Education level | <Middle school | 89 | 38.7 | 91 | 39.2 | 100 | 43.9 | >0.05 |
| | >High school | 141 | 61.3 | 141 | 60.8 | 128 | 56.1 | | in which: **ANOVA test.

(c) The characteristics of age and gender of children in the three study groups before the study showed that the ratio of boys and girls in both intervention groups was evenly distributed. The children, classified into 5 age groups, showed no significant differences at the baseline survey (p>0.05). This result is referenced in Table 4 below.

TABLE 4

Characteristics of age and gender of children in the three study groups before the study

| Index | | Control group (n = 230) | | Intervention group 1 (n = 232) | | Intervention group 2 (n = 228) | | p** |
| --- | --- | --- | --- | --- | --- | --- | --- | --- |
| | | n | % | n | % | n | % | |
| Child's age (months) | | 47.7 ± 7.6 | | 47.5 ± 8.5 | | 47.5 ± 8.6 | | 0.951 |
| Gender | Male | 123 | 53.5 | 117 | 50.4 | 126 | 55.3 | 0.576 |
| | Female | 107 | 46.5 | 115 | 49.6 | 102 | 44.7 | |
| Age group (months) | 32-35 | 17 | 7.4 | 30 | 12.9 | 28 | 12.3 | 0.211 |
| | 36-47 | 101 | 43.9 | 83 | 35.8 | 88 | 38.6 | |
| | 48-59 | 104 | 45.2 | 106 | 45.7 | 97 | 42.5 | |
| | 60-63 | 8 | 3.5 | 13 | 5.6 | 15 | 6.6 | |

($B_2$) Evaluation of the Research Effectiveness on Children's Nutritional Status After 4 Months in Intervention Group 2 Compared to the Control Group and Intervention Group 1, Including:

(a') The impact of changes in weight and height of children in the three study groups at three time points (beginning of the study, after 2 months, and after 4 months) is detailed in Table 5 below;

(b') The impact of changes in the Z-score of children in the three study groups at the three time points (beginning of the study, after 2 months, and after 4 months) is detailed in Table 6 below;

(c') Survey of the odds ratio (OR), absolute risk reduction (ARR), and number needed to treat (NTT) indices related to the rates of constipation, diarrhea, and respiratory infections after 4 months of research is detailed in Tables 7 to 9 below;

(d') Survey of the number of days and episodes during which children experienced symptoms of constipation, diarrhea, and respiratory infections after 4 months of research is detailed in Tables 10 to 12 below; and (e') The impact of changes in the rate of children with undigested stools and the rate of children with abdominal pain after 4 months of research is detailed in Tables 13 and 14 below.

TABLE 5

Survey results on changes in weight and height of children
in the three study groups after 4 months of research

| Index | Time point | Control group (n = 230) | Intervention group 1 (n = 232) | Intervention group 2 (n = 228) | p*** |
|---|---|---|---|---|---|
| Weight (kg) | $T_0$ | 14.01 ± 1.62 | 13.99 ± 1.75 | 14.03 ± 1.72 | 0.88/0.9/0.78 |
| | $T_2$ | 14.62 ± 1.72 | 14.78 ± 1.83 | 14.94 ± 1.92 | 0.33/0.05/0.33 |
| | $T_4$ | 15.0 ± 1.78 | 15.49 ± 1.85 | 15.59 ± 1.93 | 0.00/0.00/ |
| | $T_2$-$T_0$ | 0.60 ± 0.41 | 0.79 ± 0.51 | 0.91 ± 0.55 | 0.00/0.00/0.00 |
| | $T_4$-$T_0$ | 0.99 ± 0.51 | 1.50 ± 0.59 | 1.56 ± 0.61 | 0.00/0.00/0.25 |
| p ($T_2$ and $T_0$)# | | 0.000 | 0.000 | 0.000 | |
| p ($T_4$ and $T_0$)# | | 0.000 | 0.000 | 0.000 | |
| Height (cm) | $T_0$ | 98.0 ± 5.43 | 97.28 ± 5.82 | 97.73 ± 6.13 | 0.18/0.62/0.41 |
| | $T_2$ | 99.27 ± 5.34 | 98.74 ± 5.89 | 99.28 ± 6.07 | 0.32/0.99/0.32 |
| | $T_4$ | 100.35 ± 5.34 | 100.06 ± 5.96 | 100.5 ± 6.09 | 0.59/0.78/0.42 |
| | $T_2$-$T_0$ | 1.28 ± 0.72 | 1.46 ± 0.66 | 1.55 ± 0.6 | 0.00/0.00/0.00 |
| | $T_4$-$T_0$ | 2.35 ± 0.79 | 2.78 ± 0.77 | 2.77 ± 0.77 | 0.00/0.00/0.87 |
| p ($T_2$ and $T_0$)# | | 0.000 | 0.000 | 0.000 | |
| p ($T_4$ and $T_0$)# | | 0.000 | 0.000 | 0.000 | | in which: #denotes paired t-test;
***denotes independent t-test;
$T_0$ at the beginning of the study;
$T_2$ at the two-month follow-up;
$T_4$ at the four-month follow-up;
$T_2$-$T_0$ change after 2 months of research; and
$T_4$-$T_0$ change after 4 months of research.

TABLE 6

Survey results of Z-score indicators for children in
the three study groups after 4 months of research

| Index | Time point | Control group (n = 230) | Intervention group 1 (n = 232) | Intervention group 2 (n = 228) | p*** |
|---|---|---|---|---|---|
| WAZ | $T_0$ | −1.12 ± 0.74 | −1.11 ± 0.7 | −1.1 ± 0.67 | 0.91/0.72/0.81 |
| | $T_2$ | −1.04 ± 0.73 | −0.92 ± 0.71 | −0.86 ± 0.72 | 0.09/0.01/0.31 |
| | $T_4$ | −1.01 ± 0.74 | −0.74 ± 0.68 | −0.70 ± 0.70 | 0.00/0.00/0.6 |
| | $T_2$-$T_0$ | 0.09 ± 0.22 | 0.19 ± 0.26 | 0.24 ± 0.29 | 0.00/0.00/0.00 |
| | $T_4$-$T_0$ | 0.11 ± 0.27 | 0.38 ± 0.3 | 0.40 ± 0.3 | 0.00/0.00/0.49 |
| p ($T_2$ and $T_0$)# | | 0.000 | 0.000 | 0.000 | |
| p ($T_4$ and $T_0$)# | | 0.000 | 0.000 | 0.000 | |
| HAZ | $T_0$ | −1.12 ± 0.84 | −1.25 ± 0.81 | −1.16 ± 0.81 | 0.09/0.59/0.25 |
| | $T_2$ | −1.2 ± 0.82 | −1.27 ± 0.79 | −1.17 ± 0.80 | 0.29/0.7/0.15 |
| | $T_4$ | −1.22 ± 0.8 | −1.25 ± 0.8 | −1.16 ± 0.80 | 0.7/0.46/0.26 |
| | $T_2$-$T_0$ | −0.08 ± 0.17 | −0.03 ± 0.17' | −0.01 ± 0.14 | 0.00/0.00/0.00 |
| | $T_4$-$T_0$ | −0.1 ± 0.19 | 0 ± 0.2 | −0.01 ± 0.19 | 0.00/0.00/0.82 |
| p ($T_2$ and $T_0$)# | | 0.000 | 0.000 | 0.000 | |
| p ($T_4$ and $T_0$)# | | 0.000 | 0.000 | 0.000 | |
| BAZ | $T_o$ | −0.62 ± 0.81 | −0.49 ± 0.74 | −0.55 ± 0.7 | 0.05/0.31/0.35 |
| | $T_2$ | −0.41 ± 0.76 | −0.16 ± 0.73 | −0.17 ± 0.76 | 0.00/0.00/0.91 |
| | $T_4$ | −0.34 ± 0.79 | 0.09 ± 0.75 | 0.06 ± 0.76 | 0.00/0.00/0.65 |
| | $T_2$-$T_0$ | 0.21 ± 0.36 | 0.32 ± 0.43 | 0.38 ± 0.43 | 0.00/0.00/0.00 |
| | $T_4$-$T_0$ | −0.62 ± 0.81 | −0.49 ± 0.74 | −0.55 ± 0.7 | 0.05/0.31/0.35 | in which: the WAZ (Weight for Age Z-score) is the indicator used to assess weight for age according to the WHO 2006 classification [1];
the HAZ (Height for Age Z-score) is the indicator used to assess height for age according to the WHO 2006 classification [1]; and
the BAZ (Body Mass Index for Age Z-score) is the indicator used to assess the body mass index for age according to the WHO 2006 classification [1].

TABLE 7

Survey results of the ARR and NNT indices regarding the rate of constipation after 4 months of research

| Index | Control group (n = 230) | Intervention group 1 (n = 232) | Intervention group 2 (n = 228) | p |
|---|---|---|---|---|
| No constipation, n (%) | 146 (64.6) | 199 (86.5) | 192 (92.2) | 0.000 |
| Constipation, n (%) | 80 (35.4) | 31 (13.5) | 17 (7.8) | |
| OR: | | | | |
| Control group and Intervention group 1 | | 3.51 (2.99; 4.12) | | 0.000 |
| Control group and Intervention group 2 | | 6.18 (5.09; 7.51) | | 0.000 |
| Intervention group 1 and Intervention group 2 | | 1.75 (1.41; 2.18) | | 0.050 |
| ARR: | | | | |
| Control group and Intervention group 1 | | 0.21 | | |
| Control group and Intervention group 2 | | 0.27 | | |
| Intervention group 1 and Intervention group 2 | | 0.05 | | |
| NNT: | | | | |
| Control group and Intervention group 1 | | 4.56 | | |
| Control group and Intervention group 2 | | 3.66 | | |
| Intervention group 1 and Intervention group 2 | | 18.71 | | | in which: p ($X^2$ test) indicates the difference between the three research groups at time point $T_4$.

TABLE 8

Survey results of the ARR and NNT indices regarding the rate of diarrhea after 4 months of research

| Index | Control group (n = 230) | Intervention group 1 (n = 232) | Intervention group 2 (n = 228) | p |
|---|---|---|---|---|
| No diarrhea, n (%) | 197 (86.8) | 210 (92.5) | 193 (90.2) | 0.128 |
| Diarrhea, n (%) | 30 (13.2) | 17 (7.5) | 21 (9.8) | |
| OR: | | | | |
| Control group and Intervention group 1 | | 0.53 (0.42; 0.65) | | 0.067 |
| Control group and Intervention group 2 | | 0.71 (0.58; 0.87) | | 0.123 |
| Intervention group 1 and Intervention group 2 | | 1.34 (1.06; 1.69) | | 0.424 |
| ARR: | | | | |
| Control group and Intervention group 1 | | 0.06 | | |
| Control group and Intervention group 2 | | 0.03 | | |
| Intervention group 1 and Intervention group 2 | | 0.02 | | |
| NNT: | | | | |
| Control group and Intervention group 1 | | 17.46 | | |
| Control group and Intervention group 2 | | 29.39 | | |
| Intervention group 1 and Intervention group 2 | | 43.02 | | | in which: p ($X^2$ test) indicates the difference between the three research groups at time point $T_4$.

TABLE 9

Survey results of the ARR and NNT indices regarding the rate of respiratory infections after 4 months of research

| Index | Control group (n = 230) | Intervention group 1 (n = 232) | Intervention group 2 (n = 228) | p |
|---|---|---|---|---|
| No respiratory infection, n (%) | 155 (74.6) | 136 (81.5) | 142 (86.6) | 0.05 |
| Respiratory infection, n (%) | 58 (25.4) | 43 (18.5) | 29 (13.4) | |
| OR: | | | | |
| Control group and Intervention group 1 | | 1.18 (1.01; 1.38) | | 0.542 |
| Control group and Intervention group 2 | | 1.83 (1.54; 2.17) | | 0.023 |
| Intervention group 1 and Intervention group 2 | | 1.56 (1.29; 1.85) | | 0.133 |
| ARR: | | | | |
| Control group and Intervention group 1 | | 0.03 | | |
| Control group and Intervention group 2 | | 0.10 | | |
| Intervention group 1 and Intervention group 2 | | 0.07 | | |
| NNT: | | | | |
| Control group and Intervention group 1 | | 31.17 | | |
| Control group and Intervention group 2 | | 9.73 | | |
| Intervention group 1 and Intervention group 2 | | 14.15 | | | in which: p ($X^2$ test) indicates the difference between the three research groups at time point $T_4$.

TABLE 10

Number of days and episodes of constipation in children during the four-month study

| Index | Control group (n = 98) | Intervention group 1 (n = 65) | Intervention group 2 (n = 42) |
|---|---|---|---|
| Average number of days of constipation/episode | 9.8 ± 11.2 | 6.9 ± 6.8 (p = 0.06) | 6.2 ± 4.7 (p = 0.04) |
| Number of constipation episodes/child | 4.9 ± 4.5 | 3.9 ± 3.7 | 3.4 ± 2.9 | in which: p (Mann-Whitney test) represents the difference between Intervention group 1 and Intervention group 2 compared to the Control group.

TABLE 11

Number of days and episodes of diarrhea in children during the four-month study

| Index | Control group (n = 38) | Intervention group 1 (n = 24) | Intervention group 2 (n = 27) |
|---|---|---|---|
| Average number of days of diarrhea/episode | 4.5 ± 6.5 | 3.9 ± 5.2 | 3.8 ± 5.3 |
| Number of diarrhea episodes/child | 2.5 ± 2.4 | 2.3 ± 2.5 | 2.3 ± 2.2 |

TABLE 12

Number of days and episodes of respiratory infections in children during the four-month study

| Index | Control group (n = 89) | Intervention group 1 (n = 68) | Intervention group 2 (n = 53) |
|---|---|---|---|
| Average number of days of respiratory infections/episode | 5.7 ± 4.7 | 4.8 ± 4.2 | 4.2 ± 3.9 (p = 0.56) |
| Number of respiratory infection episodes/child | 1.8 ± 1.2 | 1.5 ± 1.2 | 1.4 ± 1.3 (p = 0.06) | in which: the p-value (Mann-Whitney test) indicates the difference between Intervention group 2 and the Control group.

TABLE 13

Changes in the proportion of children with undigested stools during the four-month study

| Time point | Control group (n = 230) | Intervention group 1 (n = 232) | Intervention group 2 (n = 228) |
|---|---|---|---|
| $T_0$ | 3 (1.3) | 4 (1.7) | 4 (1.8) |
| $T_2$ | 5 (2.2) | 4 (1.8) | 2 (0.9) |
| $T_4$ | 10 (4.4) | 2 (0.9) | 1 (0.5)* | in which: (0.5%)* indicates the p-value ($x^2$ test), representing the difference between Intervention group 2 and the Control group at time point $T_4$.

Referring to Table 13, at the initial time point ($T_0$), the proportion of children with undigested stools in the three study groups showed no statistically significant differences. After 2 and 4 months of the study ($T_2$ and $T_4$), the proportion of children with undigested stools decreased markedly in Intervention Group 2 (from 1.8% to 0.9%, and 0.5%, p>0.05). After 4 months, both Intervention group 1 and Intervention group 2 had lower proportions of children with undigested stools compared to the Control group. However, only Intervention group 2 demonstrated a statistically significant difference compared to the Control group (0.5% vs. 4.4%, p<0.05).

TABLE 14

Results of the survey on changes in the proportion of children experiencing abdominal pain over 4 months of the study

| Time point | Control group (n = 230) | Intervention group 1 (n = 232) | Intervention group 2 (n = 228) |
| --- | --- | --- | --- |
| $T_0$ | 23 (10) | 28(12.1) | 23 (10.1) |
| $T_4$ | 34 (14.9) | 11 (4.7)$^{m,n}$ | 5 (2.3)$^{m,n}$ | in which: $^m$p($x^2$ test): difference between intervention groups and the Control group at the respective time points;
$^n$p($x^2$ test): difference between $T_4$ and $T_0$ within the same group.

Referencing Table 14, the data indicates that at the initial time point ($T_0$), the proportion of children experiencing abdominal pain within the 2-week observation period across the three study groups showed no statistically significant differences. After 4 months of the study ($T_4$), the proportion of children with abdominal pain decreased significantly in both Intervention group 1 and Intervention group 2 (p<0.05). At the $T_4$ time point, Intervention group 1 and Intervention group 2 exhibited a significantly lower proportion of children experiencing abdominal pain compared to the control group (p<0.05).

Based on the clinical study results presented in Tables 5-13, the synergistic effects of fucosyllactose (2'-FL) and fructo-oligosaccharide (FOS) in the formula 100 have been demonstrated through various outcomes, including improvements in nutritional status (height and weight), dietary intake, and digestive disorders (loss of appetite, constipation, diarrhea, and undigested stools). Furthermore, the formula 100 supports the reduction of respiratory infections in children aged 3-5 years, particularly in those who are malnourished or at risk of malnutrition.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, element components, and/or groups thereof.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order, or steps may be added, deleted, or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

REFERENCES

[1] UNICEF, et al. UNICEF Improving Child Nutrition: The Achievable Imperative for Global Progress. New York: United Nations Children's Emergency Fund (UNICEF), 2013;
[2] McPherson, Klim. Reducing the Global Prevalence of Overweight and Obesity. The Lancet, 2014, 384(9945): 728-730;
[3] Reverri, Elizabeth J., et al. Review of the Clinical Experiences of Feeding Infants Formula Containing the Human Milk Oligosaccharide 2'-Fucosyllactose. Nutrients, 2018, 10(10): 1346;
[4] Sanders, Mary Ellen, et al. Probiotics and Prebiotics: Prospects for Public Health and Nutritional Recommendations. Annals of the New York Academy of Sciences, 2014, 1309(1): 19-29;
[5] De Vrese, Michael, and Schrezenmeir, J. Probiotics, Prebiotics, and Synbiotics. Food Biotechnology, 2008, 1-66.

What is claimed is:

1. A children formula reducing the chance of developing digestive disorders and respiratory infection comprising nutritional components and a supplementary composition containing 2'-fucosyllactose (2'-FL) and a mixture of fructo-oligosaccharide (FOS) and inulin; wherein 100 mL of the children formula comprises: 0.032 g of the 2'-fucosyllactose (2'FL), 0.54 g of the mixture of fructo-oligosaccharide (FOS) and inulin including 0.27 g of the FOS and 0.27 g of the inulin, and the nutritional components;
wherein the nutritional components are derived from milk, in which the nutritional components comprising a protein source, a fat source, a carbohydrate source, vitamins, minerals, and other nutritive substances;
wherein the other nutritive substances are selected from the group consisting of medium-chain triglycerides (MCT) fat, choline, taurine, lysine, and combinations thereof.

2. The children formula of claim 1, wherein the children formula is a young children formula.

3. A method of reducing the chance of developing digestive disorders and respiratory infection in a child comprising feeding a children formula at a frequency of two feedings per day, each feeding comprising 200 milliliters of the children formula; wherein 100 mL of the children formula comprises: 0.032 g of the 2'-fucosyllactose (2'FL), 0.54 g of the mixture of fructo-oligosaccharide (FOS) and inulin including 0.27 g of the FOS and 0.27 g of the inulin, and the nutritional components;
- wherein the nutritional components are derived from milk, in which the nutritional components comprising a protein source, a fat source, a carbohydrate source, vitamins, minerals, and other nutritive substances;
- wherein the other nutritive substances are selected from the group consisting of medium-chain triglycerides (MCT) fat, choline, taurine, lysine, and combinations thereof.

4. The method of claim 3, wherein feeding the child at a frequency of 2 times/day with each time using 200 milliliters of solution for provide 0.128 grams of 2'-FL and 2.16 grams of the mixture of FOS and inulin reducing a chance of the child developing digestive disorders and respiratory infection.

5. The method of claim 3, wherein the children formula is a young children formula.

6. A process of manufacturing a children formula comprising a step of mixing homogeneously nutritional components and a supplementary composition containing 2'-fucosyllactose (2'-FL) and a mixture of fructo-oligosaccharide (FOS) and inulin to form a children formula reducing the chance of developing digestive disorders and respiratory infection; wherein the children formula comprises: 0.032 g of the 2'-fucosyllactose (2'FL), 0.54 g of the mixture of fructo-oligosaccharide (FOS) and inulin including 0.27 g of the FOS and 0.27 g of the inulin, and the nutritional components;
- wherein the nutritional components are derived from milk, in which the nutritional components comprising a protein source, a fat source, a carbohydrate source, vitamins, minerals, and other nutritive substances;
- wherein the other nutritive substances are selected from the group consisting of medium-chain triglycerides (MCT) fat, choline, taurine, lysine, and combinations thereof.

7. The process of claim 6, wherein the children formula is a young children formula.

* * * * *